United States Patent
Becker et al.

(10) Patent No.: US 6,252,039 B1
(45) Date of Patent: Jun. 26, 2001

(54) METHOD FOR DECOLORING TETRAHYDROFURAN POLYMERS OR COPOLYMERS

(75) Inventors: Rainer Becker, Bad Dürkheim; Karsten Eller, Ludwigshafen; Michael Hesse, Worms, all of (DE)

(73) Assignee: BASF Aktiengesellschaft, Ludwigshafen (DE)

( * ) Notice: Subject to any disclaimer, the term of this patent is extended or adjusted under 35 U.S.C. 154(b) by 0 days.

(21) Appl. No.: 09/402,895

(22) PCT Filed: Apr. 2, 1998

(86) PCT No.: PCT/EP98/01946

§ 371 Date: Oct. 13, 1999

§ 102(e) Date: Oct. 13, 1999

(87) PCT Pub. No.: WO98/46663

PCT Pub. Date: Oct. 22, 1998

(30) Foreign Application Priority Data

Apr. 16, 1997 (DE) .............................. 197 15 831

(51) Int. Cl.$^7$ .............................. C08F 6/00; C08G 65/20
(52) U.S. Cl. .................. 528/485; 528/486; 528/501; 528/502 R; 528/503; 528/425
(58) Field of Search .................... 528/485, 486, 528/501, 502 R, 503, 425

(56) References Cited

U.S. PATENT DOCUMENTS

| | | |
|---|---|---|
| 2,751,419 | 6/1956 | Hill . |
| 3,935,252 | 1/1976 | Tomomatsu . |
| 4,189,566 | 2/1980 | Mueller et al. . |
| 4,480,124 | 10/1984 | Mueller et al. . |
| 4,952,673 | * 8/1990 | Mueller ................................ 528/483 |

FOREIGN PATENT DOCUMENTS

| | | |
|---|---|---|
| 28 01 792 | 7/1979 | (EP) . |
| 006 017 | 12/1979 | (EP) . |
| 052 213 | 5/1982 | (EP) . |
| 061 668 | 10/1982 | (EP) . |
| 195 910 | 10/1986 | (EP) . |
| 241 890 | 10/1987 | (EP) . |
| 541 244 | 5/1993 | (EP) . |

* cited by examiner

*Primary Examiner*—Duc Truong
(74) *Attorney, Agent, or Firm*—Keil & Weinkauf

(57) ABSTRACT

A process for decolorizing polymers or copolymers which are obtained by cationic polymerization of tetrahydrofuran or of tetrahydrofuran and alkylene oxide, in the presence or absence of a telogen, comprises
a) first, if desired, removing the low-boiling components by vacuum distillation or extraction and
b) heating the remaining polymer or copolymer in the presence of at least one auxiliary selected from the group consisting of solid oxides and/or sheet silicates to from 20 to 150° C.

4 Claims, No Drawings

METHOD FOR DECOLORING TETRAHYDROFURAN POLYMERS OR COPOLYMERS

The present invention relates to a process for decolorizing polymers or copolymers which are obtained by cationic polymerization of tetrahydrofuran (THF) or of THF and alkylene oxide, in the presence or absence of telogens.

It is known that the polymerization of THF in the presence of carboxylic anhydrides and strong acids forms polytetramethylene ether glycol or the corresponding diesters. Polytetramethylene ether glycols (PTHFS) of this type, like the copolymers obtainable by copolymerization of THF with alkylene oxides such as ethylene oxide or propylene oxide, and the copolymers obtainable by copolymerization of THF and alkylene oxides in the presence of telogens such as water, monocarboxylic acids or monohydric or polyhydric alcohols, have molecular weights of >200. They are used, in particular, for the production of polyurethanes.

As comprehensive studies have shown, acid catalysts are suitable for the polymerization of THF on an industrially economical scale, but these have the disadvantage of giving polymers with a yellow to brownish discoloration. The discoloration increases with the polymerization temperature. In addition, the purity of the PTHF also depends on the quality of the THF used.

The technical grade contains small amounts of impurities in a concentration of from 10 to 500 ppm. The chemical nature of these impurities is not known in every respect. Although this THF is of very high purity, it normally has a purity of 99.9%, even traces of impurities cause the abovementioned discoloration on polymerization. In addition, at the same time as the discoloration, a changed reactivity in the preparation of polyesters or polyurethanes from the polytetramethylene ether glycols is observed. These are serious deficiencies, since color and reproducible processing are among the most important properties of a polymer which is to be used industrially.

Numerous methods of treating technical-grade THF to improve the quality have therefore been proposed. Thus, for example, DE-A-2 801 792 describes a process in which THF is treated with bleaching earths before polymerization. Although this gives polymers having an improved color number, this method of treatment cannot in every case be applied reproducibly to every available technical grade of THF.

According to EP-A 61 668, polytetramethylene ether glycol or diesters thereof having a low color number are prepared by subjecting the polymers obtained by cationic polymerization of THF to a treatment with hydrogen in the presence of a hydrogenation catalyst. If the polymerization is carried out using a THF grade as is offered on the market, one is forced to carry out the hydrogenative decolorization at very high hydrogen pressures of, for example, from 50 to 300 bar. This high-pressure process is also expensive in ongoing production since, for example, considerable energy is required for compression of hydrogen.

In many cases, it is even necessary to use expensive noble metal catalysts. Furthermore, the catalysts required frequently have a short life. Similar limitations also apply to the decolorization of the polymers by treatment with activated carbon, as described in U.S. Pat. No. 3,935,252 or U.S. Pat. No. 2,751,419. These processes require a considerable outlay in terms of apparatus and incur additional, not inconsiderable costs for the activated carbon which, furthermore, has only a limited purification capacity.

Since the individual impurities in the THF which lead to discoloration of the end products are not known and, even after analysis, it is scarcely possible to predict whether the quality of the (possibly pretreated) THF used is suitable for giving in-specification polymers in the polymerization, it is extremely difficult in the industrial-scale production of PTHF to reliably avoid reject product.

It is an object of the invention to provide a process which allows the polymers and copolymers of THF to be decolorized in a particularly simple and effective way.

We have found that this object is achieved by a process for decolorizing polymers or copolymers which are obtained by cationic polymerization of tetrahydrofuran or of tetrahydrofuran and alkylene oxide, in the presence or absence of telogens, which comprises
a) first, if desired, removing the low-boiling components by vacuum distillation or extraction, for example with supercritical gases, and
b) heating the remaining polymer or copolymer in the presence of at least one auxiliary selected from the group consisting of solid oxides and/or sheet silicates, preferably selected from the montmorillonite-saponite or palygorskite-sepiolite group, to from 20 to 150° C., preferably from 20 to 70° C.

The novel process enables highly pure PTHF having a low color number to be prepared reliably and reproducibly. The novel process can be applied to all polymers and copolymers of THF which are obtained by cationic polymerization of THF, or by cationic copolymerization of THF and alkylene oxides such as ethylene oxide or propylene oxide, in the presence or absence of telogens.

The polymers and copolymers of THF which can be purified by the process of the present invention include, in particular, polytetramethylene ether glycols, polytetramethylene ether glycol monoethers, polytetramethylene ether glycol monoesters and polytetramethylene ether glycol diesters.

Suitable telogens, ie. substances which cause chain termination in the polymerization, in the preparation of polytetramethylene ether glycol (PTHF) are water and/or 1,4-butanediol. For the preparation of polytetramethylene ether glycol monoesters, $C_1$–$C_{20}$-monocarboxylic acids are generally selected as telogens. Preference is given to using $C_1$–$C_{20}$-monocarboxylic acids, in particular $C_1$–$C_4$-monocarboxylic acids and particularly preferably formic acid. It is possible to use either aliphatic or aromatic monocarboxylic acids, depending on the purpose for which the PTHF monocarboxylic ester is to be used. In the preparation of polytetramethylene ether glycol monoethers, the telogens used are generally monohydric $C_1$–$C_{20}$-alcohols and particularly preferably monohydric $C_1$–$C_4$-alcohols, in particular tert-butanol and benzyl alcohol. It is possible to use either aliphatic or aromatic monohydric alcohols depending on the purpose for which the PTHF monoether of a monohydric alcohol is to be used. Both in the preparation of the polytetramethylene ether glycol monoesters and in the preparation of the polytetramethylene ether glycol monoethers, it is possible for water, 1,4-butanediol and/or low molecular weight PTHF to be copolymerized into the PTHF chain. To prepare polytetramethylene glycol diesters, the telogens used are generally $C_2$–$C_{20}$-monocarboxylic anhydrides, for example acetic anhydride.

The polymers and copolymers can be prepared from a THF of commercial quality. It is of no importance whether the THF has been prepared from acetylene and formaldehyde, maleic anhydride, alkyl alcohol or butadiene.

For the purposes of the present invention, polymers are polymers and copolymers of tetrahydrofuran having degrees of polymerization of greater than 2.

The novel process enables THF polymers and copolymers which usually have color numbers of from 40 to 150 APHA to be decolorized reliably and effectively, resulting in color numbers of from 10 to 50 APHA. The initially yellowish or brownish polymers and copolymers are decolorized by the process of the present invention to give colorless polymers or copolymers. The determination of the color numbers is described in the standards DIN 53409 and ASTM-D-1209.

The polymers and copolymers to be decolorized according to the present invention can be used directly or dissolved in solvents. The preferred embodiment of the process is the solvent-free method using the upflow mode. In this embodiment, the auxiliary is either present in a fixed bed or is suspended in the polymer to be treated by the process of the present invention.

Solid oxidic auxiliaries which can be used in the process of the present invention are oxides of groups IVa, IIIa and IVb of the Periodic Table of the Elements or mixtures thereof, preferably oxides of aluminum, titanium, zirconium, or silicon, particularly preferably aluminum oxide, titanium dioxide and zirconium dioxide.

It is also possible to use sheet silicates of the montmorillonite-saponite or palygorskite-sepiolite group, preferably montmorillonite, bentonite, attapulgite or sepiolite, as are described, for example, in Klockmanns Lehrbuch der Mineralogie, 16th edition, F. Euke Verlag 1978, pages 739–765 as auxiliary in the process of the present invention.

Examples of montmorillonite which can be used in the process of the present invention are those which are obtainable under the name Tonsil®, Terrana® or Granosil® or as catalysts of the types K 10, KSF-O, KO or KS from Sud-Chemie AG, Munich. Attapulgites suitable for use in the process of the present invention are marketed, for example, by Engelhard Corporation, Iselin, USA, under the trade names Attasorb® RVM and Attasorb® LVM.

Preference is given to using essentially anhydrous sheet silicates which are obtained from the commercial water-containing sheet silicates by drying at from 80 to 200° C. at atmospheric pressure or under reduced pressure. The water content should, in particular, be less than 0.1% by weight and not exceed 0.2% by weight. The sheet silicates employed in the process of the present invention can be activated by acid treatment before use.

The auxiliaries employed according to the present invention can be used in the form of powders, for example when carrying out the process by a suspension procedure, or advantageously as shaped bodies, eg. in the form of cylinders, spheres, rings, spirals or granules, in particular in the case of a fixed-bed arrangement of the catalyst which is preferred when using, for example, loop reactors or when the process is carried out continuously.

The decolorization of the THF polymers or copolymers by the process of the present invention can be carried out continuously or batchwise.

When the process of the present invention is carried out batchwise, for example by a suspension procedure, stirred vessels or jet reactors can be used. Advantageous results are achieved when from 0.1 to 10% by weight of auxiliary, based on the polymer or copolymer, is employed. However, smaller or larger amounts can also be used.

In place of the above-described batchwise procedure, the process can also be carried out continuously, with preference being given to carrying it out by a fixed-bed method.

The invention is illustrated by the following examples which represent preferred embodiments of the invention.

EXAMPLE 1

The low molecular weight components were removed from 1700 g of crude polytetramethylene ether glycol diacetate obtained according to the process described in DE-B 1 226 560 by reacting THF with acetic anhydride over bleaching earth catalysts, by distilling the crude product at 140° C. and 10 mbar. In a reaction vessel equipped with heating and stirrer, 845 g of the distillation residue comprising polytetramethylene ether glycol diacetate and having a color number of 125 APHA were stirred at 30° C. under $N_2$ with 84.5 g of montmorillonite (K 10 from Süd-Chemie AG).

Samples were taken from the reaction vessel after 24, 48, 96 and 196 hours and the color number of the samples was determined after filtering off the montmorillonite. The color numbers determined are shown in Table 1 below.

TABLE 1

| Time (h) | 24 | 48 | 96 | 196 |
|---|---|---|---|---|
| Color number (APHA) | 35 | 25 | 20 | 15 |

EXAMPLE 2

Using a method similar to Example 1, the low molecular weight components were removed from the crude polytetramethylene ether glycol diacetate by distillation. 340 g of the distillation residue comprising polytetramethylene ether glycol diacetate (color number: 100 APHA) were then stirred at 27° C. for 19 hours with 34 g of commercial titanium dioxide (titanium dioxide VKR 611 from Sachtleben). The polytetramethylene ether glycol diacetate obtained after filtering off the titanium dioxide had a color number of 15 APHA.

EXAMPLE 3

Using a method similar to Example 1, the low molecular weight components were removed from the crude polytetramethylene ether glycol diacetate by distillation. 340 g of the distillation residue comprising polytetramethylene ether glycol diacetate (color number: 100 APHA) were then stirred at 27° C. for 19 hours with 34 g of commercial zirconium dioxide (zirconium dioxide E101 from MEL). The polytetramethylene ether glycol diacetate obtained after filtering off the zirconium dioxide had a color number of 40 APHA.

EXAMPLE 4

Using a method similar to Example 1, the low molecular weight components were removed from the crude polytetramethylene ether glycol diacetate by distillation.

340 g of the distillation residue comprising polytetramethylene ether glycol diacetate (color number: 100 APHA) were then stirred at 27° C. for 19 hours with 34 g of commercial aluminum oxide (from Alcoa). The polytetramethylene ether glycol diacetate obtained after filtering off the aluminum oxide had a color number of 20 APHA.

EXAMPLE 5

Using a method similar to Example 1, the low molecular weight components were removed from the crude polytetramethylene ether glycol diacetate by distillation.

340 g of the distillation residue comprising polytetramethylene ether glycol diacetate (color number: 100 APHA) were then stirred at 25° C. with 34 g of commercial silicon dioxide (from BASF).

The polytetramethylene glycol ether diacetate had a color number of 40 APHA.

EXAMPLE 6

250 ml of TiO$_2$ extrudates (from P25 from Degussa) were installed in a tube reactor and crude polytetramethylene ether glycol diacetate products of different colors were passed through. At 30° C. and a residence time in the reactor of 20 hours, the color number was reduced from 70 to 40 APHA or, at 40° C. and a residence time of 40 hours, from 125 to 90 APHA. Over the duration of the experiment of 53 days, an average lightening of the color by 30 APHA was achieved at various settings. Deactivation of the decolorization catalyst or carrying out of titanium were not able to be detected.

We claim:

1. A process for decolorizing polymers or copolymers which are obtained by cationic polymerization of tetrahydrofuran or of tetrahydrofuran and alkylene oxide, in the presence or absence of telogens, which comprises
   a) first, if desired, removing the low-boiling components by vacuum distillation or extraction and
   b) heating the remaining polymer or copolymer in the presence of at least one auxiliary selected from the group consisting of solid oxides of group IVa of the Periodic Table of the Elements or mixtures thereof and/or sheet silicates from the palygorskite-sepiolite group to from 20 to 150° C.

2. A process as claimed in claim 1, wherein the sheet silicate used is attapulgite or sepiolite.

3. A process as claimed in either of claim 1, wherein the sheet silicates are activated by acid treatment before use.

4. A process as claimed in claim 1, wherein solid oxides of titanium or zirconium are used.

* * * * *